*A. W. Gifford,*
*Scissors Sharpener.*
N° 62,023.   Patented Feb. 12, 1867.
Fig. 1.
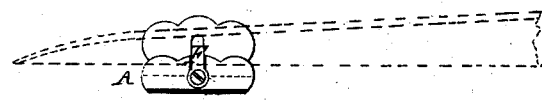
Fig. 3.   Fig. 2.
 
Witnesses
Inventor
A. W. Gifford
Per Munn & Co
Attorneys

United States Patent Office.

A. W. GIFFORD, OF WORCESTER, MASSACHUSETTS, ASSIGNOR TO HIMSELF AND HENRY D. WARD, OF THE SAME PLACE.

*Letters Patent No. 62,023, dated February 12, 1867.*

IMPROVED SCISSORS SHARPENER.

*The Schedule referred to in these Letters Patent and making part of the same.*

TO ALL WHOM IT MAY CONCERN:

Be it known that I, A. W. GIFFORD, of Worcester, Worcester county, State of Massachusetts, have invented a new and improved Scissors Sharpener; and I do hereby declare that the following is a full, clear, and exact description thereof, which will enable others skilled in the art to make and use the same, reference being had to the accompanying drawing, forming part of this specification.

The present invention relates to an extremely novel and simple instrument or implement to be used for the sharpening of scissors, whereby the cutting edges of the same can be sharpened with the utmost ease, dispatch, and convenience, as will be obvious from the following detail description thereof, reference being had to the accompanying plate of drawings, in which—

Figure 1 is a view of one side of the implement, showing a blade of a pair of scissors being drawn through the same.

Figure 2, a similar view to fig. 1, but with the side piece partially broken out to show the sharpening plate used; and Figure 3, a transverse vertical section taken in the plane of the line $x\ x$, fig. 2.

Similar letters of reference indicate like parts.

A, in the drawings, represents the frame of the implement, which, in the present instance, is made of a thin sheet of metal of suitable size, bent around at one end, with a steel bar, B, in and between the two, having its upper edge formed with a series of sharp teeth or serrations, $a\ a$, extending entirely across the width, this upper edge being bevelled or inclined, as shown in fig. 3. Over this toothed bar, between the two sides $c$ and $d$ of the frame which serve as guides, the cutting or bevelled edges of the scissors blades are drawn one at a time in the proper direction for the teeth of such bar to act upon the same, and thus impart a sharp cutting edge thereto; a bent spring, F, holding and bending the scissors blade firmly against the side D of the frame as it is drawn over the toothed bar.

From the above description it is plain to be seen that a sharpener for scissors is produced which is not only simple and cheap, but practicable and efficient in operation, desiderata of the utmost importance.

The under side of the sharpening bar B may be roughened or serrated similar to its upper side or edge, so that when one side has become useless the other can be then brought into proper position for being used.

I claim as new, and desire to secure by Letters Patent—

The serrated or file bar B, with the sides D C, provided with the spring F, substantially as described for the purpose specified.

A. W. GIFFORD.

Witnesses:
L. G. KNIFFEN,
E. D. BAGLEY.